United States Patent Office 3,306,237
Patented Feb. 28, 1967

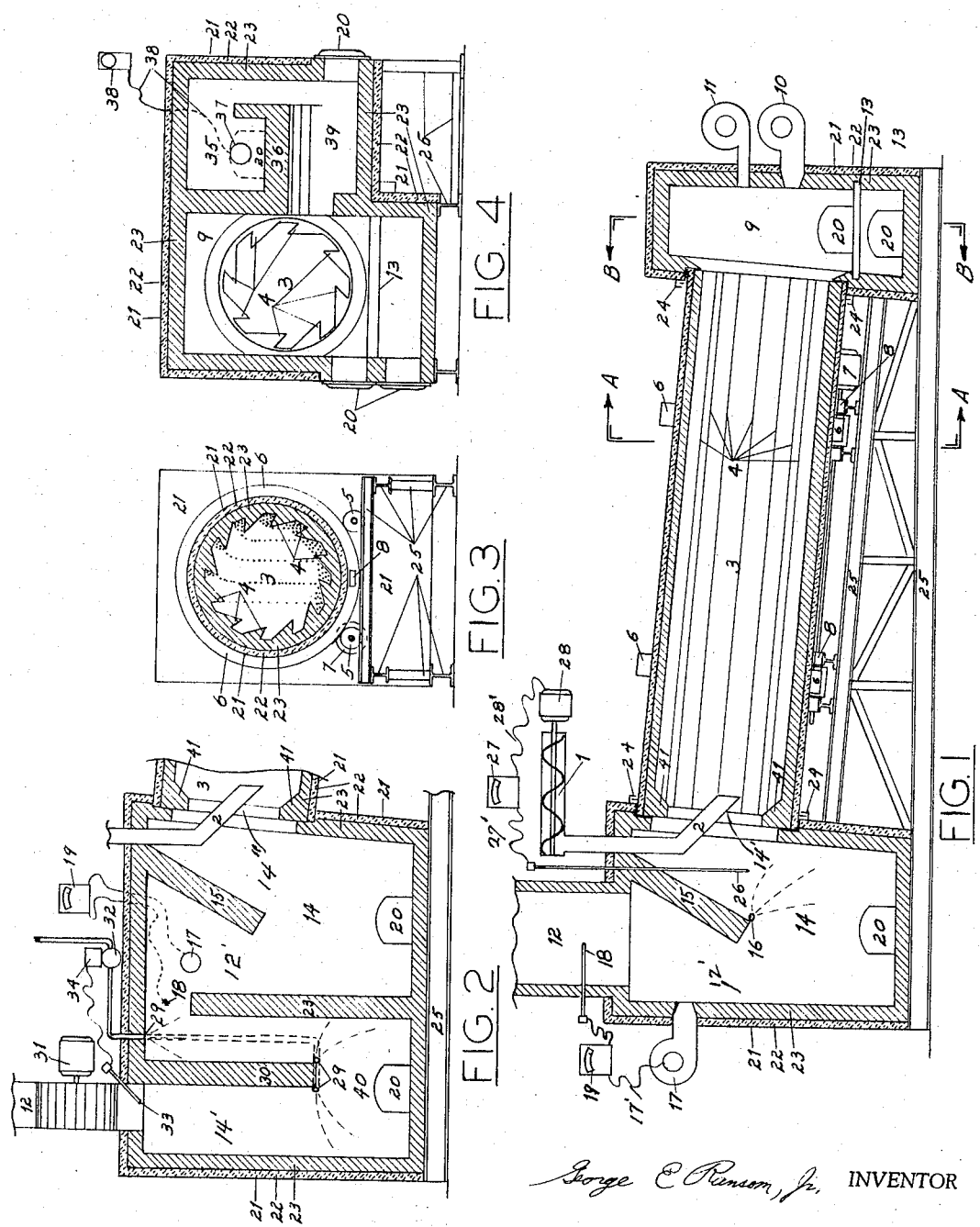

3,306,237
ROTARY INCINERATOR AND METHOD OF OPERATING SAME
George E. Ransom, Jr., 172 Beech Terrace, Wayne, N.J. 07470
Filed Jan. 28, 1964, Ser. No. 340,668
5 Claims. (Cl. 110—14)

This invention relates to a method of and apparatus for disposing of liquid and semi-liquid waste material, such as poultry manure, raw sewage and industrial effluent, such as sludge or dregs and the like, in a more efficient manner without objectionable odor or other pollution of the atmosphere in the community in which the apparatus may be located.

It is well recognized that the adequate disposal of such waste material heretofore has been difficult to obtain from a health standard requirement of the state or community without prohibitive expense for plant construction, maintenance and operation.

I am aware of many of the various types of incinerator furnaces for such purposes, but for various reasons of failure of materials in the construction, fuel control, air control and many other factors present in the critical operation of this type of furnace, they have not produced the desired reliable and satisfactory results in practical operation.

An important object of the present invention is to provide a novel equipment of furnace design to most efficiently reduce to a minimum any undesirable liquid or semi-liquid wastes to inert ash and greatly reduce or eliminate all noxious and nuisance odors and pollution generated by this type of waste.

Another important object of the present invention is to provide a novel furnace construction and method of operating the same to control the feeding of the waste material in accordance with the combustion temperature and products of combustion at the stack or disposal end of the furnace.

Another object of the invention is to provide a novel arrangement of inclined rotary furnace construction having communicating combustion chambers at the upper or entrance end and lower or discharge end thereof so as to effect a continuous flow of combustion products with the required amount of fuel and air to effect the desired complete combustion results.

Another object of the invention is to provide a novel form of inclined rotary incinerator kiln and the method of operating the same to more effectively eliminate air pollution in the vicinity thereof as a result of burning waste material.

Another object of the invention is to provide interconnected feed, fuel, air and temperature control apparatus at each critical stage of waste and odor consumption so as to reduce to a minimum any odors and fly ash escaping to the atmosphere during continuous operation of the furnace.

Another object of the invention is to provide particular materials of construction at the strategic and critical portions of the furnace which shall increase the efficiency of the furnace as well as reduce to a minimum costly repairs and shut-down delays which are usually prohibitive in the operation of furnaces of this type.

A further object of the invention is to provide a novel form of furnace construction for handling a wide variety and condition of waste material in the rotary kiln combustion chamber and adjacent communicating parts thereof in a more efficient and sanitary manner than heretofore obtained in similar type apparatus heretofore employed.

These and other objects of the invention will be more manifest from the following specification and drawings and more particularly set forth in the claims.

In the drawings:
FIGURE 1 is a sectional view in elevation of the incinerator apparatus;
FIGURE 2 is a sectional view of a modification of the stack end of the incinerator;
FIGURE 3 is a sectional view on line A—A of FIGURE 1;
FIGURE 4 is a sectional view on line B—B of FIGURE 1.

Referring to FIGURES 1, 2 and 3 of the drawings, there is shown an inclined cylindrical open-ended rotary kiln type of furnace 3. Material is fed to the furnace by a suitable feeder 1 and duct 2. The rotary kiln combustion chamber 3 extends between two stationary furnace chambers or housing 9 and 14 having walls of refractory material indicated by the numeras 23—23. The furnace walls 23 are made from high temperature refractory material which shall stand temperatures of substantially 2000°–3000° of temperature without any deleterious effects, such as warping or burning out. The rotary kiln walls, as well as the stationary refractory furnace walls, are enclosed or covered by suitable insulation material indicated by the numerals 22—22 and this insulation is further enclosed by a suitable outside supporting casing 21, such as steel plate and structural members or the like.

The rotary kiln chamber is supported in an inclined position at an angle to most efficiently effect the desired movement of the material forward in the combustion zone at a rate sufficient to drive off moisture and start combustion at the entrance zone and effect the desired substantially complete combustion at the lower or discharge end of the kiln.

The rotary kiln is bounded by a pair of circumferential tracks 6—6 spaced apart and guided by support rollers 8—8 located on the supporting structure 25. One or more of the rollers may be power driven by a connecting motor 7, or a circumferential gear. The entire kiln structure is mounted on a suitable support structure of structural steel, indicated by the numeral 25.

One important feature of the rotary cylindrical kiln construction 3 is the longitudinally extending ribs in the form of teeth 4. These ribs are formed of high temperature refractory material and may be in the form of lifts with forward blunt edges 4' so that they shall continuously pick up and work the material and carry it to a vertical position in the furnace and then drop it through a heating flame provided at the lower or discharge end of the cylinder 3 by means of a motor driven heating fuel burner 10 assisted by motor driven blower 11. It will be noted that adjacent rows of teeth 4 form longitudinal peripherally disposed pockets having acute angularly disposed sides, the top side of which extends inwardly and somewhat segmentally to collect material and drop the same gradually as the kiln revolves. The movement of the material during this operation is gradual from one flight pocket to the next lower pocket, thus agitating the material and exposing it to the maximum heat during its travel forwardly and finally discharged into the adjacent heating chamber 9. Since the fuel and air supplies face the open end of the kiln, the blasts of flame pass throughout the length of the kiln. The burner 10 assisted by an associated air blower 11 may be independently adjusted or automatically connected in circuit with the feed motor 28 so that the proper amount of heat may be delivered to the kiln to properly consume the predetermined quantity of waste material which may be of dry or wet consistency without smoke or odor and a minimum amount of residue. Combustion is further aided by the collection of any material on grate 13 in the combustion chamber 9 and subjected to intense heat. In other words, the novel installation system contemplates providing a positive control of the furnace heat in accordance with the material fed to the furnace.

The advantages of forming the novel lift pockets by adjacent parallel rows of high temperature refractory teeth 4 are many and provide a relatively narrow bottom portion and relatively divergent side walls 4'—4' for structural strength and this arrangement substantially prevents caking of wet material. This construction also aids in preventing the material from clinging to the side walls and tooth ends which frequently results to retard proper drying and combustion. By providing teeth of high temperature refractory material, a more efficient combustion zone is provided with a minimum liability of damage to the structure, and thus necessitating costly repairs or shutdown of the installation.

The ends of the kiln 3 may be sealed from the adjacent connecting chamber 14 and the lower chamber 9 by appropriate seal apparatus, indicated by the numerals 24—24, and thus prevent any leakage of odor from the kiln. These seals necessarily perform different functions. The seal adjacent to chamber 9 prevents a leakage of combustion products and odors to the atmosphere and the seal adjacent to chamber 14 permits the infiltration of cold outside air into the chamber 14. The upper end of the kiln is provided with a choke ring 41 for the purpose of restricting the combustion gas flow which will have the effect of increasing the temperature in kiln 3 and will result in retaining heat in the kiln and effect a more rapid drying and burning of the waste material. This ring 41 also serves the purpose of preventing unburned waste material being carried into chamber 14 which may be termed an after combustion chamber. This afterburner chamber 14 is fired by a fuel burner 17 which may be under the control of a thermocouple 18 under the control of a regulator 19, as hereinafter more fully described.

The final combustion chamber 14 is provided with an entrance opening 14' for receiving the hot gaseous products of combustion of the waste material being burned and any residue of incomplete combustion passed from the retort furnace 3. Adjacent the opening 14' and spaced therefrom is a baffle wall or drop arch 15 supported by the side of the chamber 14. This baffle drops or extends substantially the depth of the opening 14' so as to provide a zone of turbulence to further aid complete combustion of the gaseous products. There may be located in this zone a temperature indicator thermocouple 26 having direct electrical connection with an electrical motor 28 connected to drive the feed mechanism 2, as indicated by the numeral 27'. This motor 28 is also under the direct control of a regulator 27 connected in circuit therewith, as indicated by the numeral 28'. It will be noted that this arrangement provides a direct control of the waste feed device 1 with the condition of the products of combustion at the exit or throat portion 14' from kiln 3. Also, a water spray device 16 in FIG. 1, and 29 in FIG. 2, is shown for the purpose of eliminating or reducing solid matter that may be entrained in the combustion gases before entering the stack 12, which further controls the condition of the residue discharged from the retort furnace 3 to the stack 12 to be discharged to atmosphere.

The spray device 16 is supplied with water from a suitable source through a control valve 32, FIG. 2, and a controller 34 associated therewith. The controller 34 is connected in circuit with a thermocouple temperature indicator 33 located at the base entrance to the stack 12 so as to accurately regulate the temperature of combustion products at this point. However, in some commercial applications it has been found that these sprays are not necessary.

As a further check on the temperature condition of the discharged products to the stack 12, there is provided a motor driven afterburner 17 located in the top region of chamber 14 and positioned above the throat area 12' near the base entrance to the stack 12. This afterburner may be under the control of a thermocouple 18 also located near the base of the stack 12, FIG. 1, and prior to water spray in FIG. 2. This thermocouple 18 is connected in circuit with a controller 19 as indicated by the circuit connection 17'. From the foregoing it will be observed that the operator has complete control either by manual or automatic means of the coordination of the feeding and final condition of the combustible waste material. If for any reason the stack 12 does not supply sufficient draft to provide sufficient movement of the products of combustion through the furnace system, there is provided a motor driven blower 31 in the stack or chimney 12.

In the modification shown in FIGURE 2 there is provided an additional conditioning chamber 14' for treating the products of combustion after leaving chamber 14 and before reaching the stack 12. This arrangement provides a baffle wall 23' extending upwardly from the bottom wall of the furnace and a downwardly extending baffle wall or drop arch 30 adjacent to the baffle 23' and substantially parallel therewith to form a further mixing area 40 for the products of combustion. Water sprays 29 at the top of the area 40, and also at the bottom of the baffle 30 to further treat, condition and purify the products of combustion by settling out any foreign solids such as fly ash and the like. Any residue in the chambers 9, 14 or 14' may be removed from suitable clean-out openings 20—20 located at the bottom portion of the chambers.

Another feature of the present novel incinerator construction is provision for taking care of difficult burning waste material such as dead bird carcasses which can be a substantial problem in a disposal operation of this character. Adjacent to chamber 9, as shown in FIGURE 4, there is provided a cremation chamber 35. This chamber includes a hearth 36 of high refractory material to radiate intense heat and thus consume any waste to ash. The heat thus generated is then passed to the system by means of a lower channel chamber 39 at the bottom portion of the hearth 36 and will aid in the combustion process in kilns 3 and be cleansed in the after chamber 14 by means already described. The temperature of the chamber 35 is regulated or controlled by a motor operated fuel burner 37 and a suitable timer connected therewith by wires 38.

Thus having described an incinerator apparatus for burning to complete combustion any waste material, such as poultry manure, industrial effluence and carcasses without any offensive odors or pollution of the atmosphere, it is obvious that many changes may be made therein without departing from the scope of the appended claims.

What I claim is:

1. The method of operating a waste material incinerator which comprises, feeding waste material to the forward end of an inclined imperforate refractory lined and insulated rotary kiln incinerator furnace chamber, agitating and moving the material with a lifting and falling movement of the material by a rotary motion of the kiln, supplying fuel and air at the lower end of the kiln and in axial alignment therewith counter to the sloping movement of the material in the kiln to effect combustion throughout the kiln, conducting the gaseous products of combustion from the elevated end of the kiln to an adjacent furnace chamber having open communication therewith, and automatically regulating through thermal electrical impulses the feeding of waste material to the kiln by the temperature of said adjacent chamber to effect odorless combustion of the material prior to the discharge to outside atmosphere.

2. The method of operating a waste material incinerator which comprises, feeding waste material to the forward end of an inclined rotary kiln incinerator furnace chamber, agitating and moving small increments of the material by a rotary motion of the kiln, supplying fuel and air under pressure at the lower end of the kiln counter to the movement of the material in the kiln to effect combustion throughout the kiln, conducting the gaseous products of combustion from the elevated end of the kiln to an adjacent furnace chamber, passing the products of combustion to a succeeding chamber, and subjecting said gaseous products prior to their entrance to a stack to a high sufficient for effective elimination of odor and moisture for reducing to a minimum any fly ash in said succeeding chamber.

3. In an incinerator furnace structure for waste material, the combination with an open-ended inclined rotary kiln combustion chamber, means for feeding waste material at the elevated entrance end of said kiln, a stationary combustion furnace chamber at the lower end of said kiln and having a sealing connection therewith, furnace ring means for retaining heat at the upper end of said kiln, rib means of high refractory material extending longitudinally of the kiln with an angular design for lifting and distributing the combustible waste material through the combustion air of said kiln for the more rapid drying and burning of the waste material, tortuous passage means for delivering gaseous products of combustion to the atmosphere, and temperature responsive means subject to counter heat flow adjacent to the entrance end of said kiln to regulate the feeding of waste material to said kiln.

4. Apparatus of the character described in claim 3 including heat and liquid spray means for treating said products of combustion in said chamber prior to discharge to the atmosphere, whereby odors and residue are reduced to a minimum.

5. In an incinerator for waste material, the combination with an open-ended inclined rotary kiln combustion chamber, means for feeding waste material at the elevated entrance end of said kiln, a combustion furnace chamber at the lower end of said kiln, means for retaining heat at the upper end of said kiln, an inclined baffle wall located adjacent to the entrance end of said kiln, passage means formed by said baffle and the furnace walls for directing products of combustion to a discharge chimney, a fluid spray device located adjacent the bottom end of said baffle for directing fluid into said passage and said associated chamber for cleansing the discharge products of combustion, and an afterburner located in said rear chamber and adjacent to said inclined baffle for adding supplemental heat to the products of combustion prior to discharge to the atmosphere for the positive elimination of odors.

References Cited by the Examiner

UNITED STATES PATENTS

| | | | |
|---|---|---|---|
| 1,555,513 | 9/1925 | Nibecker | 110—14 |
| 1,925,875 | 9/1933 | McLaughlin et al. | 263—32 |
| 1,963,574 | 6/1934 | Abel | 110—8 |
| 2,127,328 | 8/1938 | Egan | 110—14 |
| 2,274,780 | 3/1942 | Duerr et al. | 110—14 |
| 2,508,458 | 5/1950 | Heimbach | 110—8 |

FOREIGN PATENTS 871,027   10/1957   Great Britain.

FREDERICK L. MATTESON, JR., *Primary Examiner.*

JOHN J. CAMBY, *Examiner.*